(12) United States Patent
Ferguson et al.

(10) Patent No.: US 12,020,205 B2
(45) Date of Patent: Jun. 25, 2024

(54) CONSUMER PURCHASING ASSISTANT APPARATUS, SYSTEM AND METHODS

(71) Applicant: Taco Marketing LLC, Fort Myers, FL (US)

(72) Inventors: Todd B. Ferguson, Fort Myers, FL (US); Andrew M. Czachowski, Greenfield, WI (US)

(73) Assignee: TACO Marketing LLC, Fort Myers, FL (US)

(*) Notice: Subject to any disclaimer, the term of this patent is extended or adjusted under 35 U.S.C. 154(b) by 0 days.

(21) Appl. No.: 17/847,097

(22) Filed: Jun. 22, 2022

(65) Prior Publication Data
US 2022/0318738 A1   Oct. 6, 2022

Related U.S. Application Data

(62) Division of application No. 16/616,363, filed as application No. PCT/US2018/034409 on May 24, 2018, now Pat. No. 11,436,559.
(Continued)

(51) Int. Cl.
| | |
|---|---|
| *G06Q 10/087* | (2023.01) |
| *G06F 16/951* | (2019.01) |
| *G06F 16/953* | (2019.01) |
| *G06K 7/14* | (2006.01) |
| *G06Q 30/02* | (2023.01) |
(Continued)

(52) U.S. Cl.
CPC ......... *G06Q 10/087* (2013.01); *G06F 16/951* (2019.01); *G06F 16/953* (2019.01); *G06K 7/1417* (2013.01); *G06Q 30/0206* (2013.01); *G06Q 30/0601* (2013.01); *G06Q 30/0605* (2013.01); *G06Q 30/0611* (2013.01); *G06Q 30/0633* (2013.01); *G06Q 30/0635* (2013.01)

(58) Field of Classification Search
None
See application file for complete search history.

(56) References Cited

U.S. PATENT DOCUMENTS 6,639,156 B2 * 10/2003 Luke .................... G06Q 10/087
                                                          705/28
7,107,226 B1    9/2006 Cassidy
(Continued)

FOREIGN PATENT DOCUMENTS

| EP | 1024448 A2 | 8/2000 |
|---|---|---|
| WO | 2000072213 | 11/2000 |
(Continued)

OTHER PUBLICATIONS

International Search Report issued in PCT Patent Application No. PCT/US2018/034409; dated Oct. 18, 2018, 3 pages.
(Continued)

*Primary Examiner* — Nicholas D Rosen
(74) *Attorney, Agent, or Firm* — Fitch, Even, Tabin & Flannery LLP

(57) ABSTRACT

A method of managing inventory comprising generating a list of inventory items, identifying removal of one of the inventory items from inventory, updating the list of inventory items as inventory items are removed, predicting a future rate of removal of inventory items, and developing purchasing plan for inventory items based on predicted rate of removal.

9 Claims, 16 Drawing Sheets

Related U.S. Application Data

(60) Provisional application No. 62/591,039, filed on Nov. 27, 2017, provisional application No. 62/510,612, filed on May 24, 2017.

(51) Int. Cl.
*G06Q 30/0201* (2023.01)
*G06Q 30/06* (2023.01)
*G06Q 30/0601* (2023.01)

(56) References Cited

U.S. PATENT DOCUMENTS

| | | | |
|---|---|---|---|
| 7,676,404 B2* | 3/2010 | Richard | G06Q 10/087 705/28 |
| 8,229,802 B2* | 7/2012 | Henry | G07F 17/12 705/28 |
| 8,543,480 B2 | 9/2013 | Mueller | |
| 8,612,276 B1 | 12/2013 | Nielsen | |
| 9,990,597 B2* | 6/2018 | He | G06Q 30/0202 |
| 10,025,759 B2 | 7/2018 | Mulder | |
| 10,318,917 B1* | 6/2019 | Goldstein | G06Q 20/203 |
| 10,574,794 B1 | 2/2020 | Minh | |
| 10,672,062 B2* | 6/2020 | Higgins | G06Q 30/0633 |
| 10,956,855 B1* | 3/2021 | Coughran | G06N 20/00 |
| 11,030,571 B2* | 6/2021 | Glasgow | G06Q 10/087 |
| 11,851,279 B1* | 12/2023 | Chinoy | B65G 1/137 |
| 2001/0034671 A1* | 10/2001 | Luke | G01G 19/4144 705/28 |
| 2002/0152139 A1* | 10/2002 | Hogan | G06Q 10/087 705/28 |
| 2002/0156702 A1 | 10/2002 | Kane | |
| 2002/0184102 A1 | 12/2002 | Markopoulos | |
| 2004/0138962 A1 | 7/2004 | Kopelman | |
| 2004/0199435 A1 | 10/2004 | Abrams | |
| 2005/0049942 A1* | 3/2005 | Richard | G06Q 10/06 705/28 |
| 2005/0075949 A1 | 4/2005 | Uhrig | |
| 2005/0114235 A1 | 5/2005 | Snyder | |
| 2005/0160014 A1 | 7/2005 | Moss | |
| 2005/0160115 A1 | 7/2005 | Starkweather | |
| 2007/0276880 A1 | 11/2007 | Lu | |
| 2009/0222359 A1* | 9/2009 | Henry | G06Q 50/04 705/28 |
| 2009/0254447 A1 | 10/2009 | Blades | |
| 2009/0294469 A1* | 12/2009 | Poulain | G01G 13/00 222/64 |
| 2010/0121752 A1 | 5/2010 | Banigan | |
| 2010/0256994 A1 | 10/2010 | Eisenberger | |
| 2011/0295783 A1 | 12/2011 | Zhao | |
| 2011/0301749 A1* | 12/2011 | Hammonds | G07F 11/38 700/240 |
| 2012/0089480 A1 | 4/2012 | Fusz | |
| 2013/0018724 A1 | 1/2013 | Winslade | |
| 2014/0122228 A1 | 5/2014 | Wical | |
| 2014/0214547 A1* | 7/2014 | Signorelli | G06Q 30/0267 705/14.64 |
| 2014/0351695 A1 | 11/2014 | Xing | |
| 2015/0186978 A1 | 7/2015 | Prindle | |
| 2015/0186982 A1* | 7/2015 | Higgins | G06Q 30/0639 705/26.8 |
| 2016/0104229 A1 | 4/2016 | Craft | |
| 2016/0132821 A1* | 5/2016 | Glasgow | G06Q 10/087 705/28 |
| 2016/0148236 A1 | 5/2016 | Evdokimo | |
| 2016/0171586 A1 | 6/2016 | Jung | |
| 2016/0259344 A1 | 9/2016 | High | |
| 2016/0283881 A1 | 9/2016 | He | |
| 2017/0017646 A1 | 1/2017 | Kumar | |
| 2017/0109687 A1 | 4/2017 | Kamadolli | |
| 2017/0293881 A1* | 10/2017 | Narkulla | G06Q 10/083 |
| 2019/0066216 A1 | 2/2019 | Teixeira | |
| 2019/0087769 A9* | 3/2019 | Glasgow | G06Q 10/087 |
| 2019/0295099 A1 | 9/2019 | Wilkinson | |
| 2020/0175464 A1 | 6/2020 | Ferguson | |
| 2021/0019813 A1 | 1/2021 | Ferguson | |

FOREIGN PATENT DOCUMENTS

| | | |
|---|---|---|
| WO | 2015095493 | 6/2015 |
| WO | 2016161483 | 10/2016 |

OTHER PUBLICATIONS

Patent Cooperation Treaty, International Search Report issued in International App. No. PCT/US2022/029233, dated Oct. 5, 2022, 4 pp.

Patent Cooperation Treaty, International Searching Authority, Written Opinion of the International Searching Authority issued in International Application No. PCT/US2022/029233, dated Oct. 5, 2022, 5 pp.

USPTO; U.S. Appl. No. 16/932,355; Final Rejection dated Oct. 13, 2023; (pp. 1-11).

USPTO; U.S. Appl. No. 16/932,355; Non-Final Rejection dated Jun. 7, 2023; (pp. 1-10).

* cited by examiner

| FRED | | Search here..... | | | | Joe Rep ▾ |
|---|---|---|---|---|---|---|
| Dashboard | Your Documents | | | | | C ▾ |
| Profile | Create | Reference | | Total Value | Responses | |
| Documents › | 2017-03-02 10:32:10 | 1BQ52KG.pdf | | 1288.95 | 🗐 Bid | |
| Group Buys | 2017-03-02 07:49:32 | Quotation #0218616179-ESRIG LLC.PDF | | 1231.01 | 🗐 Bid | |
| Items | 2017-03-02 11:56:08 | SHI Quote-12841821.pdf | | 1363 | 🗐 Bid | |
| | 2017-03-02 12:09:13 | Computer Build | | 163.07 | | |
| | | | | | | |
| PCM Sales Mutual NDA....pdf ▾ | | | | Show All | | ✕ |

FIG. 6

CONSUMER PURCHASING ASSISTANT APPARATUS, SYSTEM AND METHODS

CROSS REFERENCE TO RELATED APPLICATIONS

This application is a Divisional of U.S. application Ser. No. 16/616,363, filed Nov. 22, 2019, which is the National Stage of International Application No. PCT/US2018/034409, filed May 24, 2018, which claims the benefit of U.S. Provisional Application No. 62/591,039, filed Nov. 27, 2017, and U.S. Provisional Application No. 62/510,612, filed May 24, 2017, which are hereby incorporated herein by reference in their entirety.

TECHNICAL FIELD

This invention relates generally to consumer purchasing and, more particularly, apparatus and systems for online purchasing and methods relating thereto.

BACKGROUND

E-commerce is becoming an increasingly popular way for consumers to purchase all kinds of goods. While it has long been common to purchase specialty goods online, many online stores are expanding into common household goods, such as groceries and toiletries. However, with so many online stores offering the same goods and each of those stores having dynamic prices, it can be difficult for a consumer to find the best deal. Additionally, many stores or sellers offer better prices to bulk purchasers.

In conventional price comparison products, software or services, it is known to search the internet for a particular product by its barcode, name or other identifying indicia to locate comparable prices, however, such systems require the user to actively submit the information being searched and/or they fail to recognize standard forms (e.g., estimates, purchase orders, invoices, proposals, etc.). In addition, conventional systems can easily be thwarted by changing the location of certain data on a form to prevent the form from being machine readable or recognizable due to a change from a prior format.

Conventional inventory control systems have similar shortcoming where they require the user to actively submit the information being stocked and manually update the inventory as the items are moved or used. When inventory runs low, the user must manually order replacements. Alternatively, the user can estimate their rate of consumption and manually create a subscription to reorder at a set rate.

Accordingly, it has been determined that the need exists for an improved consumer purchasing assistant apparatus and inventory control apparatus, system and related methods which overcomes the aforementioned limitations and which further provides capabilities, features and functions, not available in current products, services and methods.

BRIEF DESCRIPTION OF THE DRAWINGS

FIG. 3 is a screenshot from an example apparatus, system and/or method for assisting in consumer purchasing;

FIG. 4 is a screenshot from an example system for assisting in consumer purchasing;

FIG. 6 is a screenshot from an example system for assisting in consumer purchasing.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the present disclosure, a system is provided for assisting consumer purchasing. An example system receives an input indicating a desired product or list of products. This list is parsed and the system identifies online listings of the products for sale and identifies the cheapest. The system additionally searches for sales, coupons, group buy opportunities, and other means of decreasing the sale price. In one form, the system maintains a list of desired products, and periodically performs another search to identify the cheapest seller. When the cheapest price drops, the user is notified. In another form, the system forms a group comprising a plurality of users who desire the same product in order to form a bulk purchase. The users are informed of the current size of the group and the required size in order to qualify for the group buy discount. The users are periodically updated as the group grows until it reaches the purchase size.

Figure 1A:
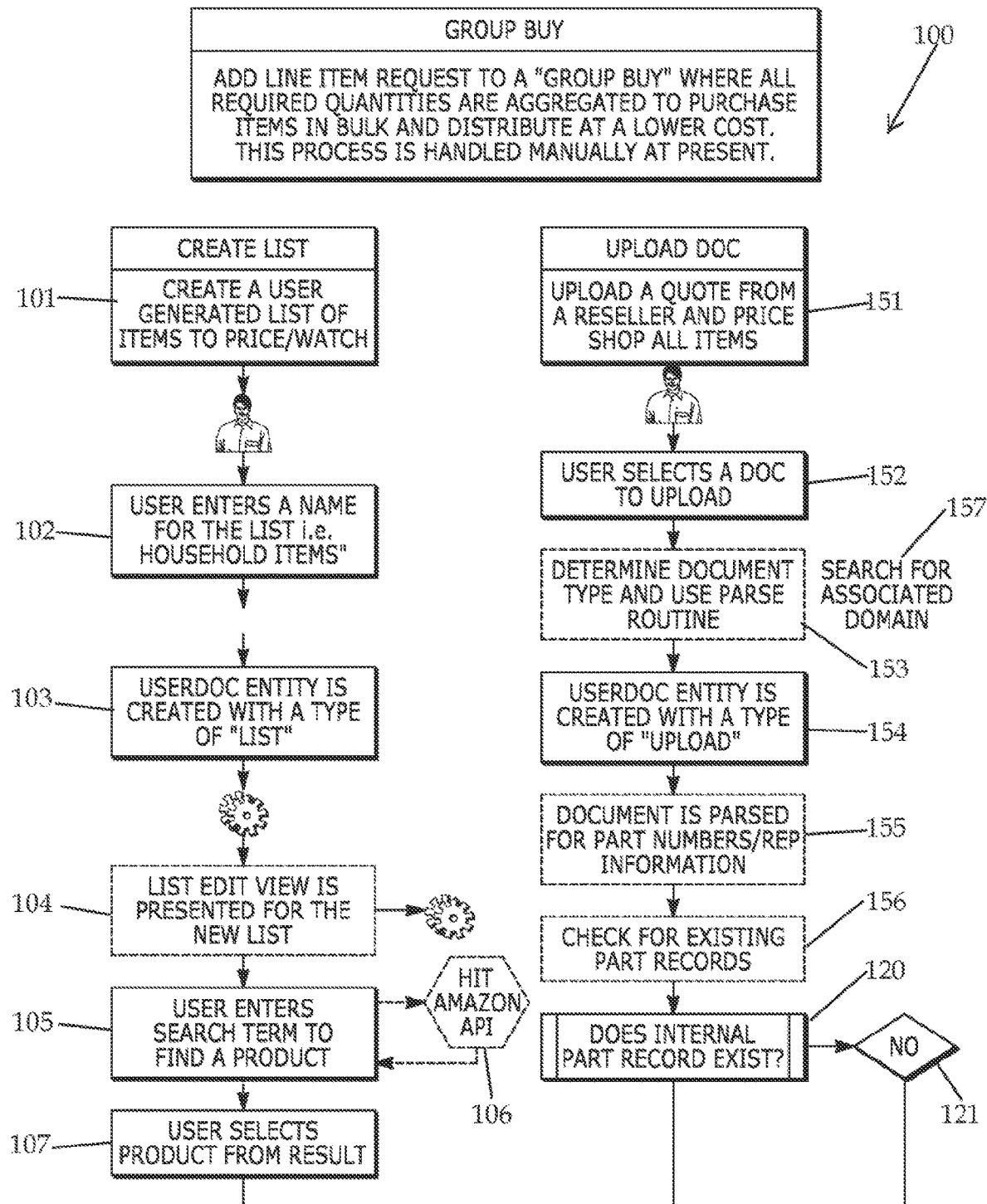
FIGS. 1A-1B show a flow diagram of an apparatus, system and/or method for assisting in consumer purchasing.
Figure 1B:
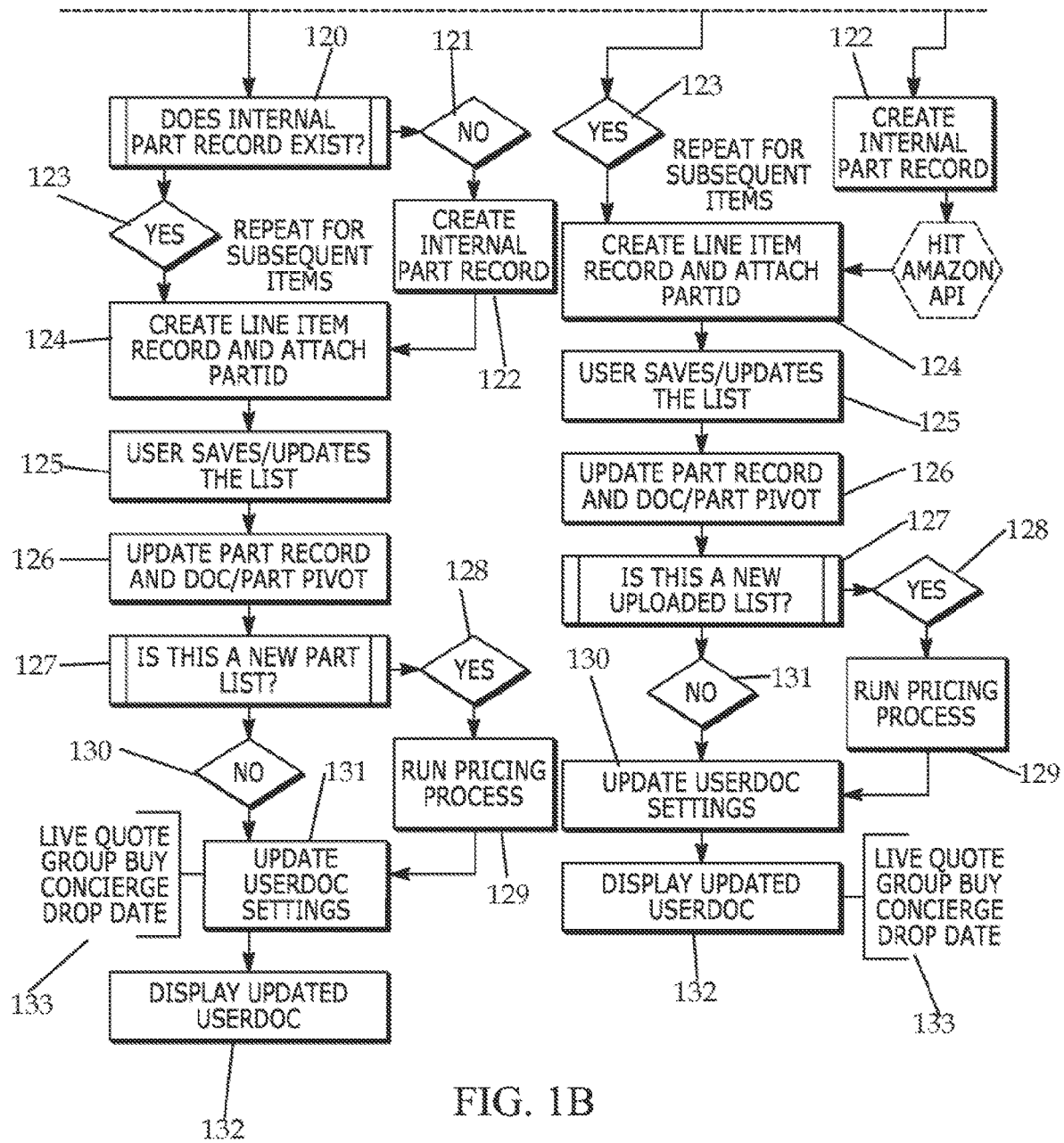
Figure 3:
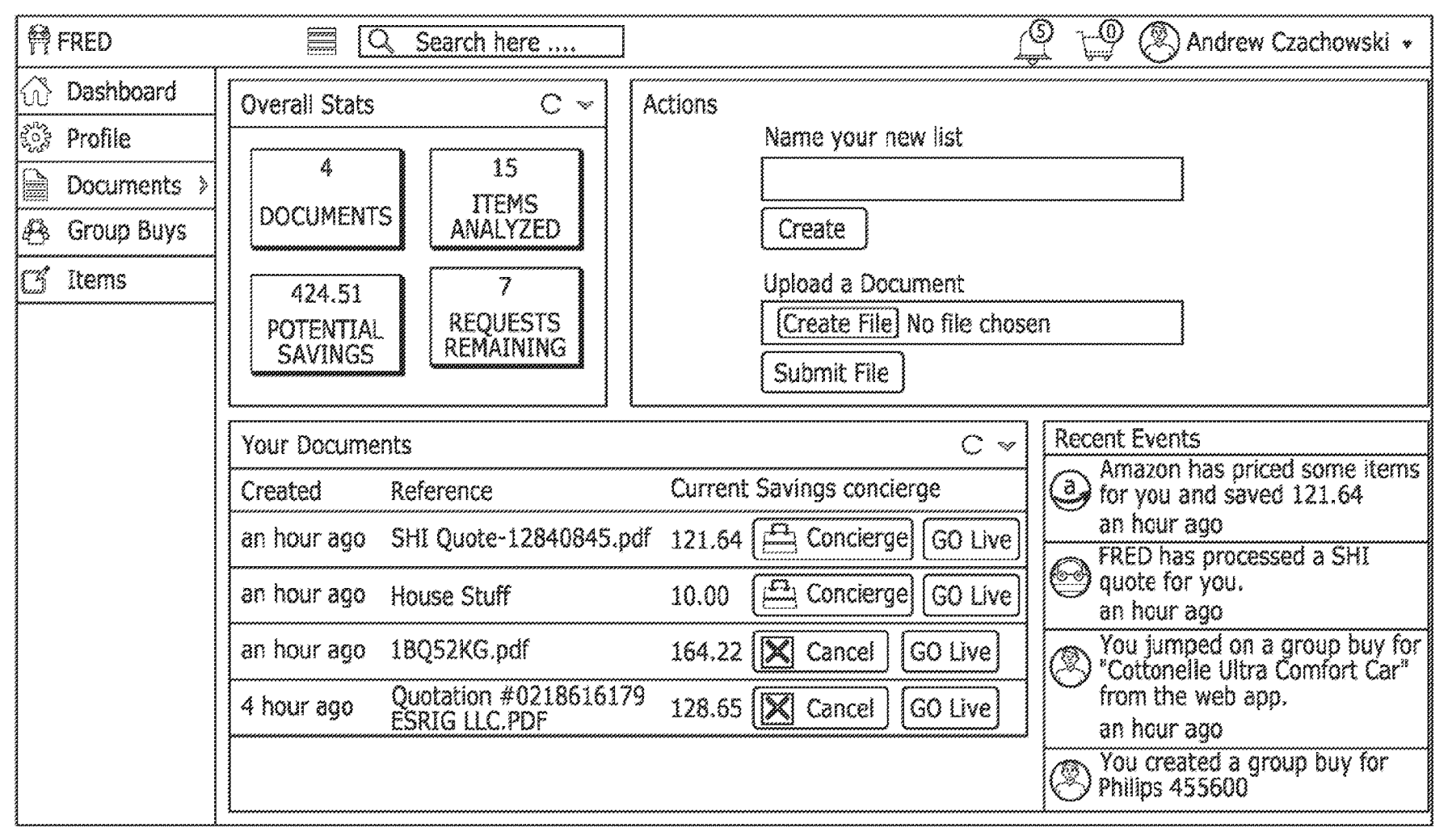

FIGS. 1A-1B illustrate a flow chart of the group buy process 100. To start, the user can either upload a document having a list or start a new list on the system from the dashboard, see FIG. 3. If the user opts to create 101 a list on the system, they input 102 a title for the list. The system then forms 103 a blank list which they can edit 104 by adding search terms to find the desired products. As they enter 105 the search terms, a list of available products is generated by the system from which the user selects 107 the product they are searching for. In one form, the search utilizes 106 an Amazon API gateway. This product is then added to the list. These steps are repeated until the list is fully formed.

Instead, a user may decide to upload 151 an existing list. Exemplary lists include inventory databases or price sheets from resellers. First, the user selects 152 a document to upload. The system determines the document type and then parses 153 it. In some forms, information parsed from the list is used to search 157 for an associated domain. For example, the domain of a reseller associated with the types of products identified in the parsing process or the domain of a reseller specifically identified in the uploaded document. A new document is formed 154 to store the data that is parsed from this uploaded document. The parsing 153 identifies and extracts 155 product identifying information, such as part numbers, or product names. The parsed information is then checked 156 against existing records containing lists of available products in order to form a list on the system.

Once a list is formed on the system, the system checks 120 for an internal part record of each product. For any products that do not 121 already have an internal part record, one is created 122. Once each product on the list has 123 an internal part record, a line item record is created 124 with the part ids of the products attached. The user can then save 125 the list. The list us editable, so that the user can add or remove products to it at any time. When the list is saved and updated, the system updates 126 the part record.

Figure 4:
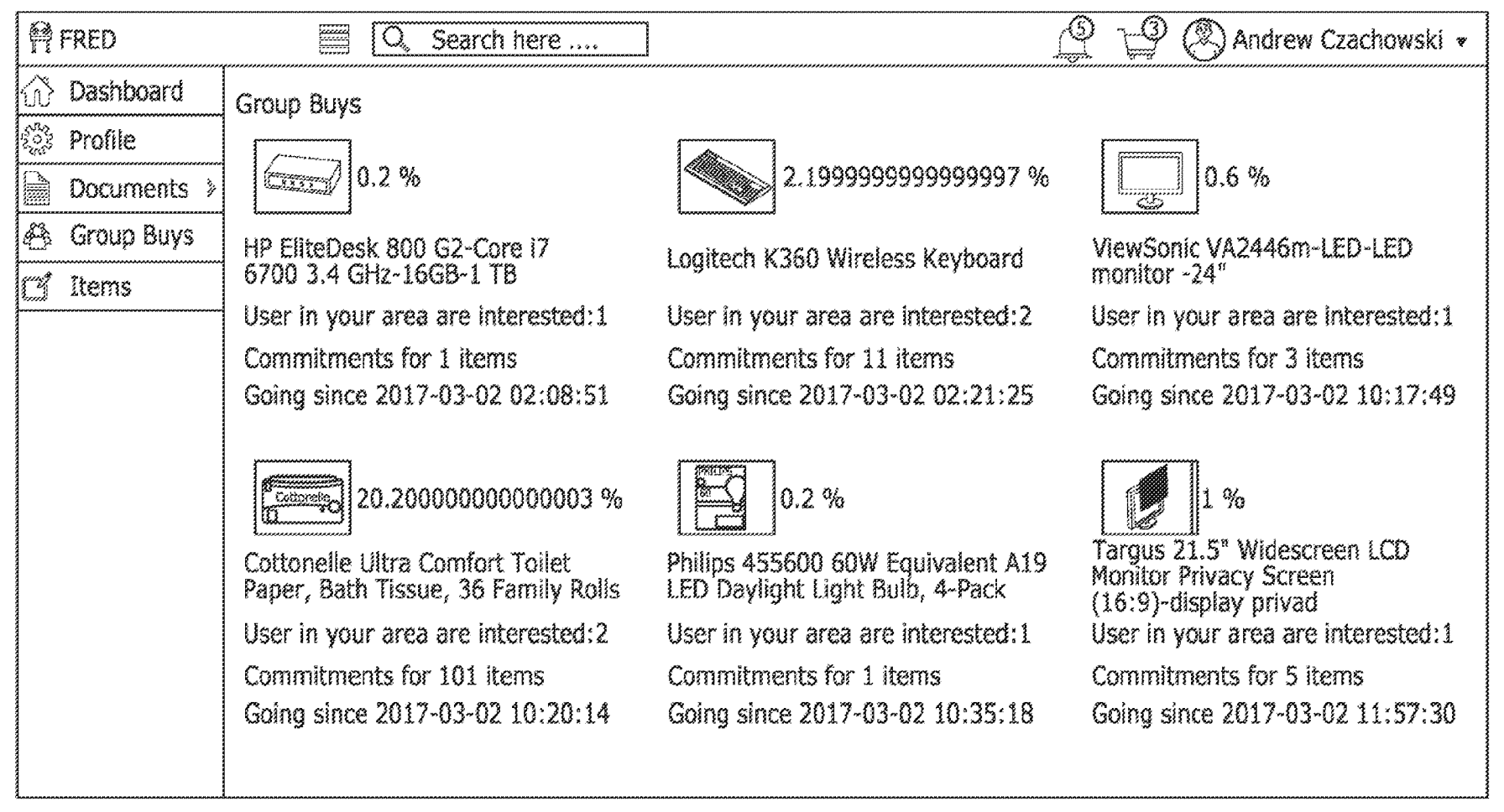

The system determines 127 if a new list or newly updated list with a new part is uploaded. If so 128, a pricing process is run 129 on the newly added products to identify the best deals, such as group buys. Regardless of whether 128 or not 130 the update included a new list or new parts, the document settings are updated 131 to reflect the update. The updated document is displayed 132 to the user. Live quotes for available groups for the products are identified 133 on a group buys page of the user portal to the system, see FIG. 4. The user can then join the groups so that they product can be purchased at the wholesale price once the group is large enough.

Figure 2A:
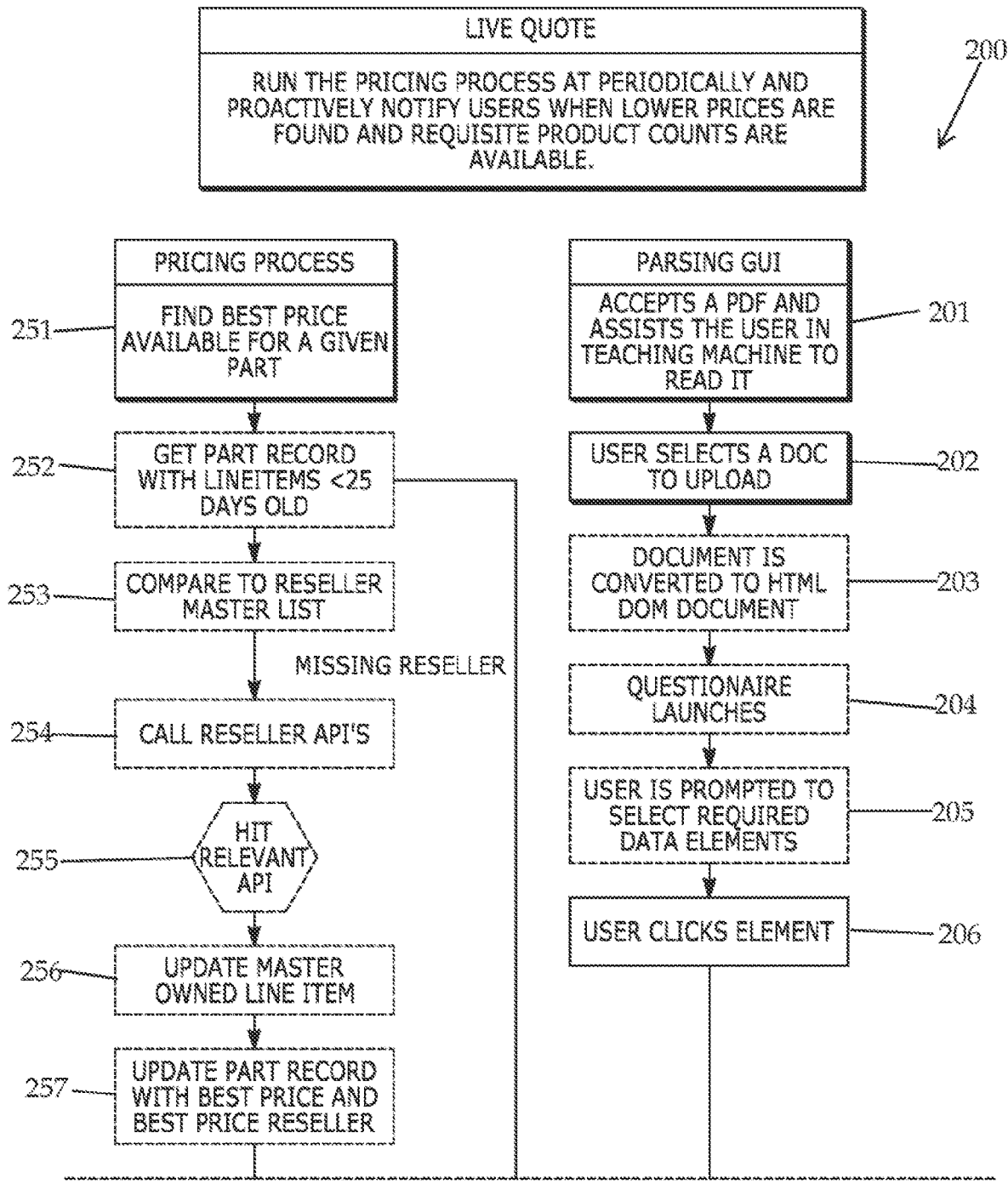
FIGS. 2A-2B show a flow diagram of an apparatus, system and/or method for assisting in consumer purchasing.
Figure 2B:
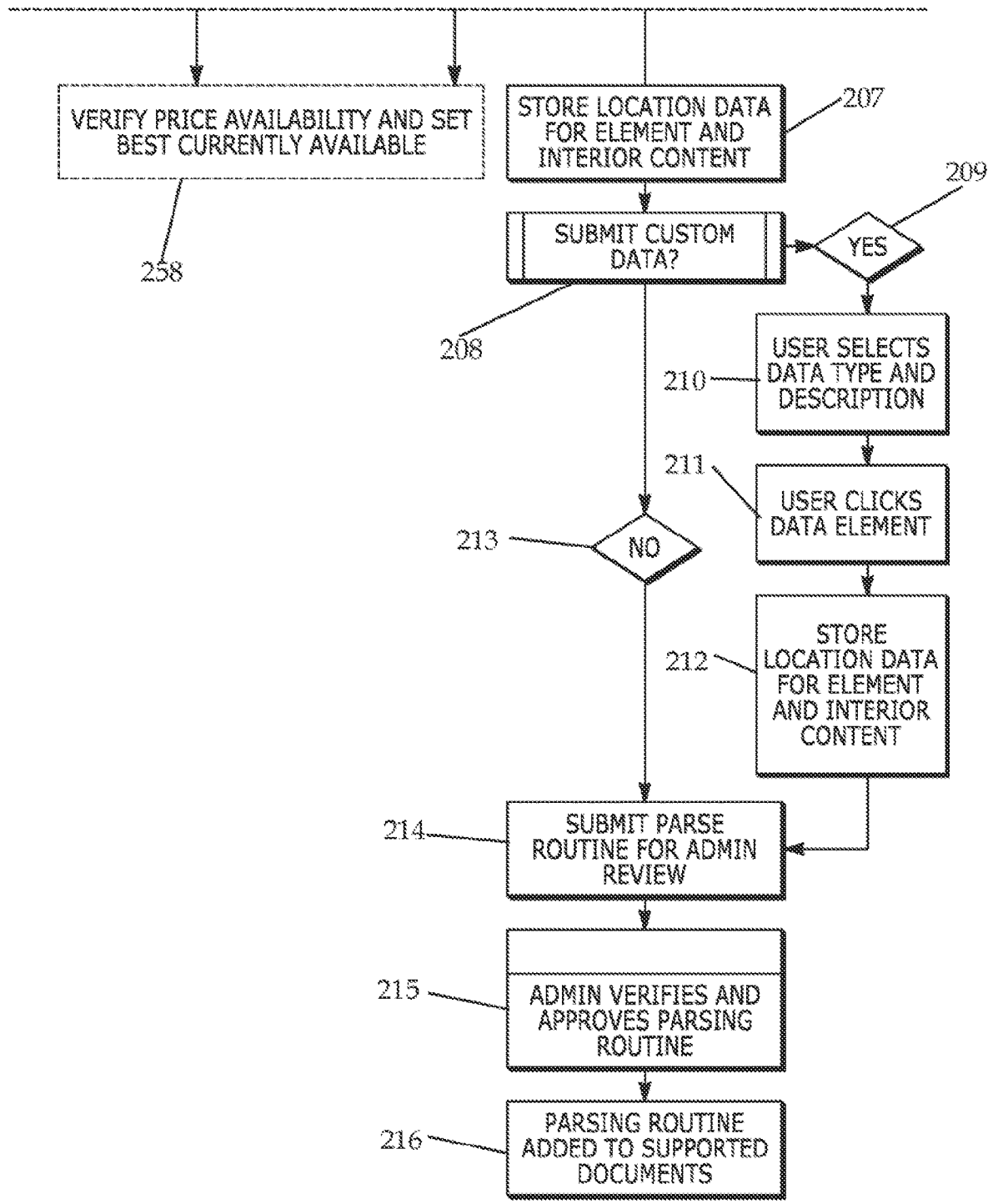
Figure 5:
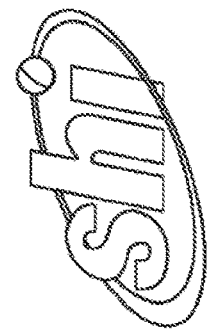
FIG. 5 is a screenshot from an example system for assisting in consumer purchasing.

FIGS. 2A-2B are a flowchart of a process 200 for monitoring prices. The pricing process keeps a list of products desired by the user, and periodically searches available sellers to find the best price available. The process includes a parsing graphical user interface 201 which accepts a document from the user and then learns to read the document with the help of the user. As with the above process, the user can input an existing list by selecting 202 a saved document and uploading the document. In some forms, the document is automatically identified and uploaded without user input. For example, the system includes a web browser extension that monitors the user's online shopping activities and/or emails to identify purchases and attempted purchases. In some forms, the extension uploads products to the live quote system 200 as they are added to an online shopping cart, and then a live quote is provided in real time if better prices are available elsewhere.

The document is converted 203 from the uploaded document type, such as a PDF, to a HTML document. The system then parses the document to identify the listed products. In one form, parsing involves asking the user questions to help identify the products. The questions are displayed 204 via the user portal and the answers are input by the user. Specifically, the user is prompted 205 to select the required data elements from the document. As the required elements are listed, such as part number, quantity, etc., the user clicks 206 on where the element is located on the document. The data parsed form the clicked portion of the document is stored 207 in a portion of memory associated with that element. If the product cannot be identified by the automated questionnaire, the user can input custom data to help identify the product. The custom data is reviewed by a system admin to identify the products. To utilize custom data, the system first determines 208 if custom data is needed. If so 209, the user selects 210 the data type and description from a list. The user then clicks 211 on the data element corresponding to the selected data type. The system stores 212 the location data within the document of the data element.

After the data is all entered, regardless of whether 209 or not 213 custom data was required, the parse routine is submitted 214 for review by a system administrator. The administrator verifies and approves 215 the parsing routine, at which point it is added 216 to the supported document. Adding 216 the parsing routine to the supported documents, allows future documents of that type to be parsed automatically without the need for user inputs through a questionnaire or custom data.

The system crawls the web to identify 251 the best prices available for listed products. This includes searching the list price for sellers and resellers as well as identifying sales literature, coupons, and other price reducing means. In some forms, other methods of acquiring price information is used in addition to or instead of crawling the web. For example, a plurality of users upload documents having bid prices provided by resellers. The bid prices are parsed by the system and listed in the best price record, allowing the system to find prices even better than any publicly available on the Internet.

For any price identified that is determined 252 to be less than a predetermined age, such as 25 days old (in other embodiments the age can be altered from 25 days to another length), the price is compared 253 to the master list of sellers kept by the system. If the reseller is already on the system, the price is updated in the master list. If the reseller is not in the system, the reseller is contacted 254 via the API. Contacting the reseller via the API involves first identifying 255 the correct API. The new reseller can then be added 256 to the master list. The master list is updated 257 to reflect the new best price and best price reseller. The master list prices are used to display the best available price to the user.

The system periodically runs this pricing process in order to identify the best deals for purchasing the listed products as well as to verify 258 the availability of the best price item. The prices are displayed to the user on the created list, see FIG. 6. In some forms, the user can identify a purchase price. Once the list price drops to or below the pre-identified purchase price, the products is automatically purchased in a predetermined quantity. The system additionally informs the user of any group buy opportunities for items on the list.

In addition to the methods of finding prices described above, the pricing process 251 in some forms includes a bidding process. A document containing the identity and quantity of products desired by the user are submitted to a number of resellers, distributors, or other representatives collectively known as concierge representatives. The concierge representatives return price bids to fulfill the order. In some forms, these price bids are then used to update the best price database for use for both the user associated with the list as well as other users.

FIGS. 7A-7F illustrate a method and system for managing inventory utilizing the processes of 1A-2B above. First the current inventory of the user, such as an organization or company, must be entered into the system. The system is a cloud hosted asset management application designed to streamline the management of resources, for example IT resources, in a company setting. The system includes applications for handling recording inventory, ordering inventory, deploying inventory, and tracking inventory, such as recording consumption of consumable resources. The system analyzes data over time to augment the resource management plans, such as automatically updating the order subscriptions of consumable products, recommending orders and frequencies, and identifying surplus or stagnant inventory to be resold.

The term "user" is used herein to describe the activities of a person interacting with the system. The "user" need not be an individual, it can instead be a team of individuals each of whom have access to the system. In some forms, multiple members of an organization have access to a shared account with different roles, such as manager, IT employee, and deployable person. Additionally, locations and person assigned to pieces of inventory are tracked and that activity is also managed over time. In some forms, every member of an organization has some access to the system to access and/or edit data with respect to inventory currently assigned to them.

Figure 7A:
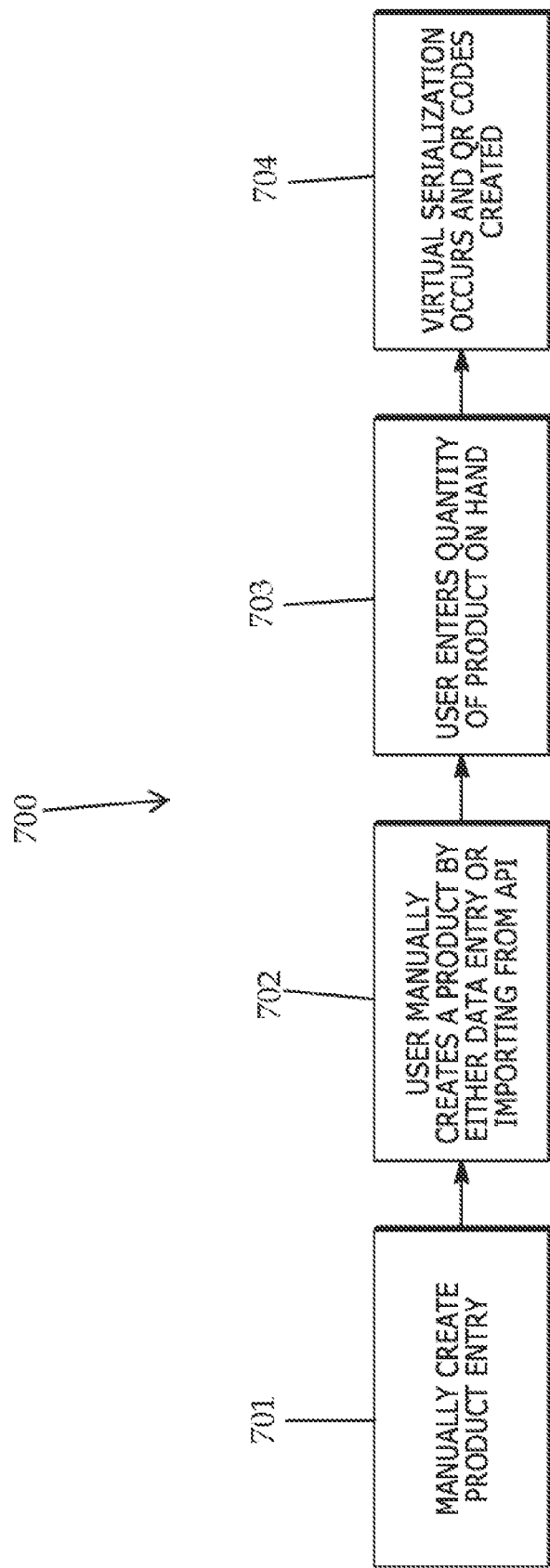
FIGS. 7A-7F show flow diagrams of an apparatus, system and/or method for assisting in inventory management.

As described in FIG. 7A, product entries are manually created 701. In some forms, the product entries are manually created by entering 702 the relevant data into a form in the system. Alternatively, the product entries are imported from a format understood across multiple operating systems, such as an API. For each product entered, the user enters 703 a quantity of products currently on hand. The system then generates 704 virtual serializations for each individual product. The serializations are unique to the individual units, not just to the type of product. For example, if the user inputs that the current stock includes 20 laptop computers. The system will generate 20 unique virtual serializations to correspond to the 20 individual laptop computers. Each serialization has a corresponding code that can be attached to the unit, such as printed and pasted. For example, barcodes, QR codes, or 3D barcodes can be used, printed out, and then secured to the units. In some forms, RFID stickers are used for the virtual serialization. By these codes, individual units can be scanned, such as by a portable computer or smartphone, and then data on that unit is retrieved from the system. The data can be stored locally on a central computer or in cloud storage.

Use of the virtual serialization is also used by individuals in possession of resources to input and manage requests, such as deployment requests, support requests, or trouble tickets. In one form, an application on a smartphone displays forms for making the requests in connection with a scanned code, the application records the user inputs into the form and then transmits the form to the relevant individual, such as the IT department.

Figure 7B:
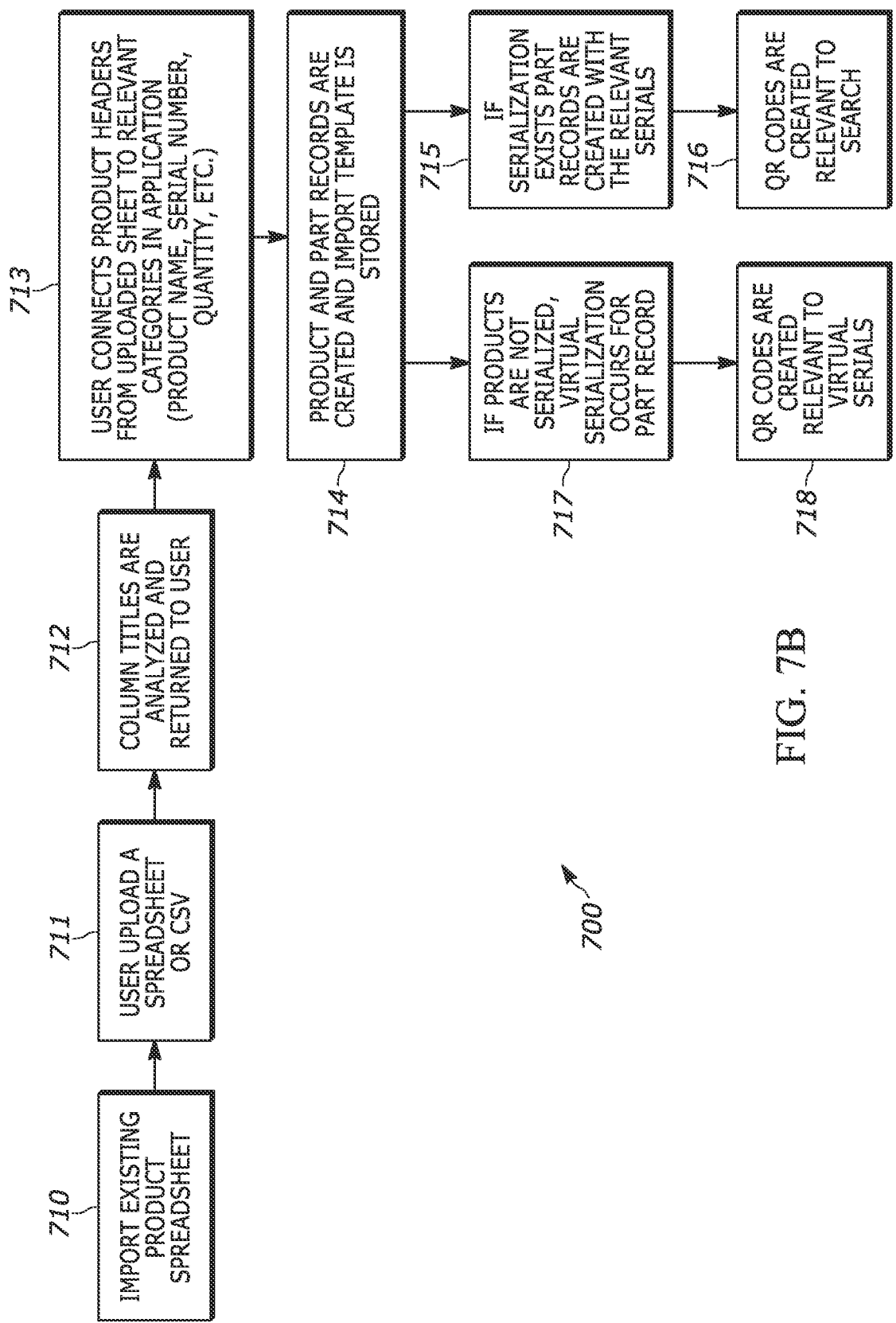
Figure 7C:
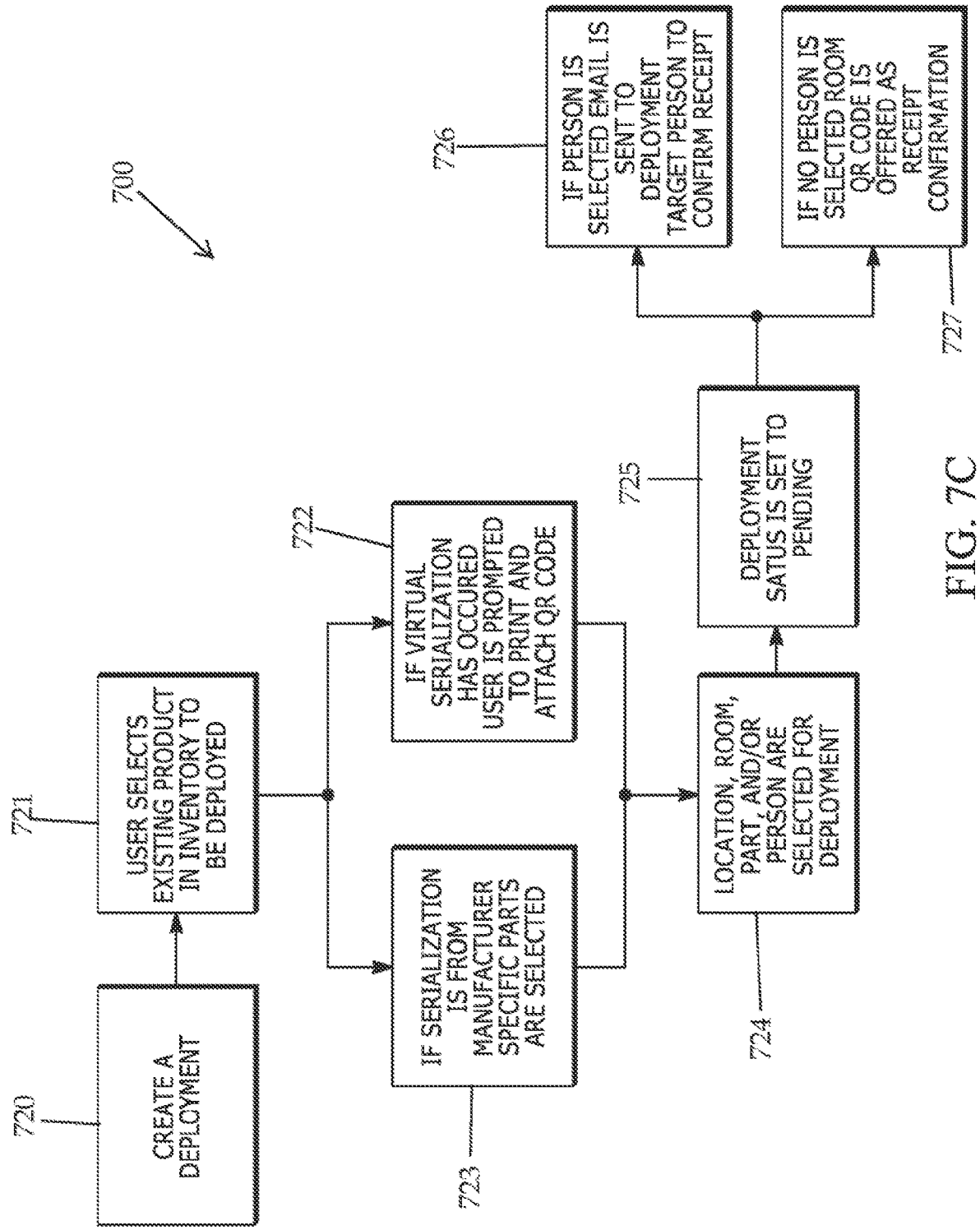

Instead of manually inputting each inventory entry into the system, existing inventory databases can be parsed for the relevant information through the import 710 existing product sheet process shown in FIG. 7B. The parsing is substantially similar to the parsing described above. The user uploads 711 the database file, such as a spreadsheet or comma separate values ("csv") formatted text file. The system scans the column and row titles, analyzes them, and returns 712 them to the user. The scanned titles are compared to expected titles, such as "name", "serial number", "quantity", "manufacturer", etc. If the titles are not automatically identified by the system in this comparison, they are displayed to the user who is prompted to input 713 information identifying what the title refers to. Once the columns or rows are connected to corresponding categories in the system, the product and part records are created 714. The import template is stored 714 such that when future documents having the same template are uploaded, the titles can be identified without user input.

Some products might already have individual, unique serialization. If the products have unique serializations, part records are created 715 with the relevant serials. The system uses those serializations and generates 716 codes, such as QR codes, that can be printed and attached to the product based on those serializations. If no individual serializations already exist, virtual serializations are created 717. Then, corresponding codes, such as QR codes, are created 718 which are also printed and attached to the products.

In some forms, the QR codes are not generated and printed/attached until the product leaves inventory. For example, if the inventory has 20 laptops, 20 serializations are created. However, these 20 serializations are not assigned to individual laptops until the laptops are deployed. When the first laptop is deployed, it is assigned the first of the 20 serializations and is marked with the codes, such as a QR code. The other laptops are marked as they are deployed in the same manner. Deployment is described in greater detail in FIG. 7C. To deploy 720, the user selects 721 a product in the system to be deployed. If the product is unmarked, they are prompted to print and attach 722 a code as described above. If the product is already marked 723, such as by the manufacturer or during a past deployment, this step is skipped. The user further selects 724 a target of deployment. The target can be a location or a person. In some forms, the location may be another product, for example a computer component may be deployed to a computer.

The system records 725 the deployment as pending until confirmation is received. If the deployment is to a person, the person is prompted 726, such as via the application or via email to confirm receipt of the product. Once it is confirmed the system update the location of the product. If the product is being deployed to a location, the person doing the deploying confirms 727 deployment. In some forms the individual locations, such as individual rooms, have serialization and corresponding codes, such as QR codes. When a product is deployed, the person doing the deploying can scan the QR code of the room to confirm deployment.

Figure 7D:
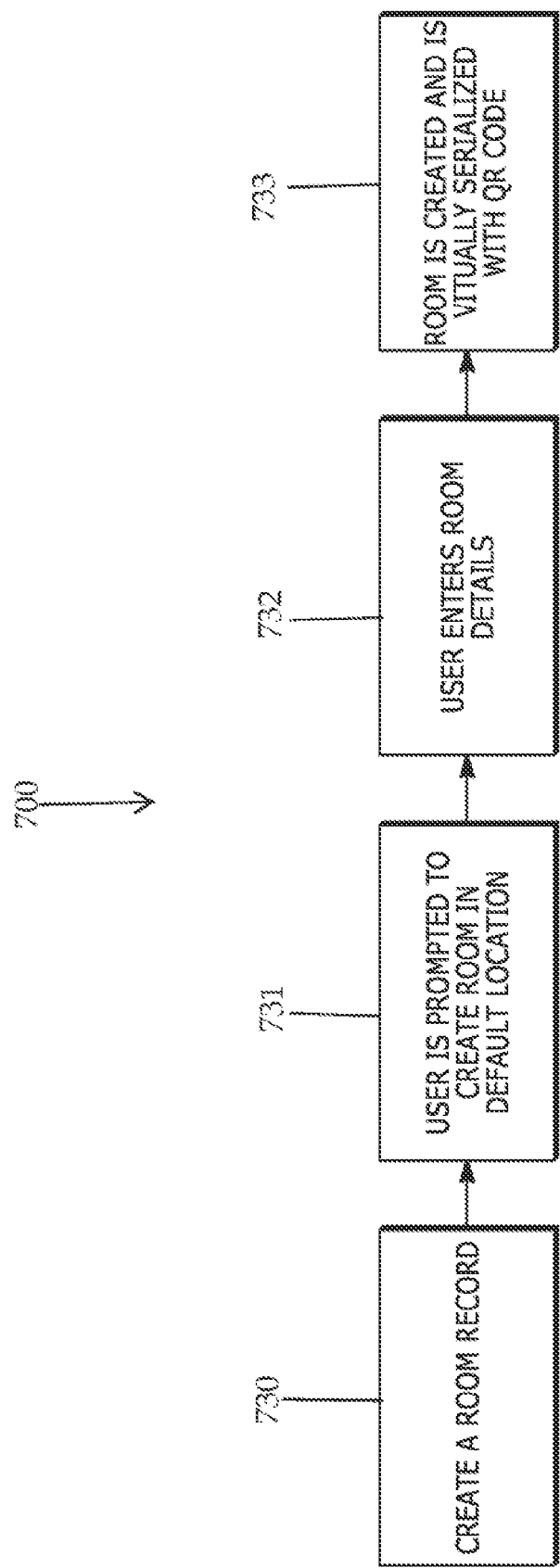

Creation 730 of a location is illustrated in FIG. 7D. The user creates 731 an entry for a room in the system. The user then enters 732 information about the room into a form generated and displayed by the system. The system then creates 733 a virtual serialization with a corresponding code so that the room can be marked.

Figure 7E:
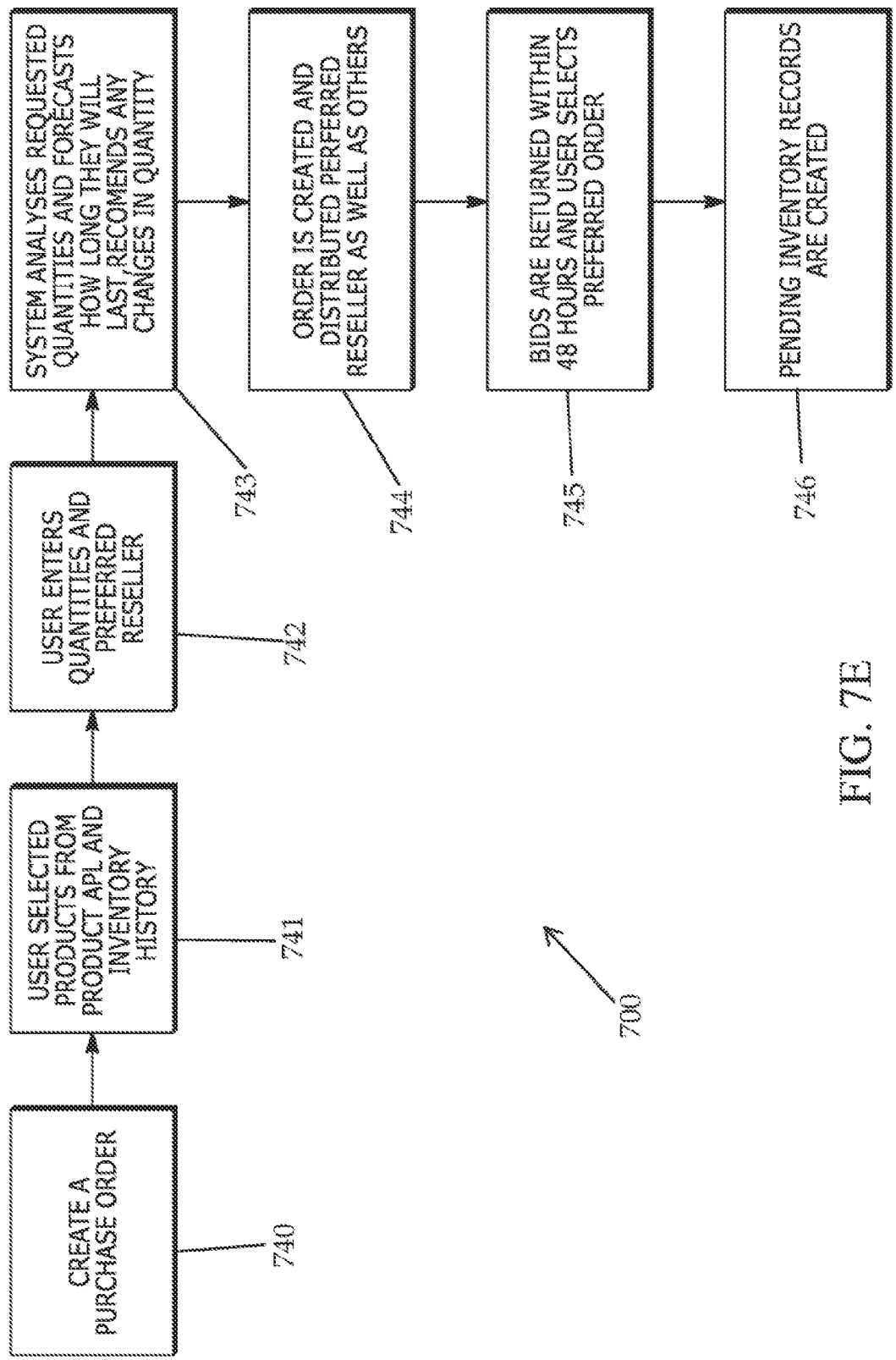

Turning to FIG. 7E, the system can be used to coordinate with entities outside of the organization for inventory control, such as by creating 740 purchase orders. A user can manually create a purchase order by selecting 741 a product from their API or from their inventory history. The user then enters 742 the quantity to be purchased. In some forms, the user selects a preferred reseller from which to make the purchase. The system analyzes 743 the request and forecasts how long it will take to fulfill the order based on information from the systems and methods of FIGS. 1A-2B above. The order is created 744 and distributed to the preferred reseller as well as other resellers. The resellers return 745 bids within a predetermined amount of time, such as 48 hours, which are displayed to the user so that the decision can be made. In some forms, the decision is automated based on previously input preferences. For example, the order can automatically accept the lowest cost bid that can deliver the product by a predetermined deadline or within a predetermined timeframe. Alternatively or additionally, the system may store a list of previously approved to disapproved resellers. Once the order is processed, pending inventory records are created 746 so that serializations can be assigned once the order is received.

Figure 7F:
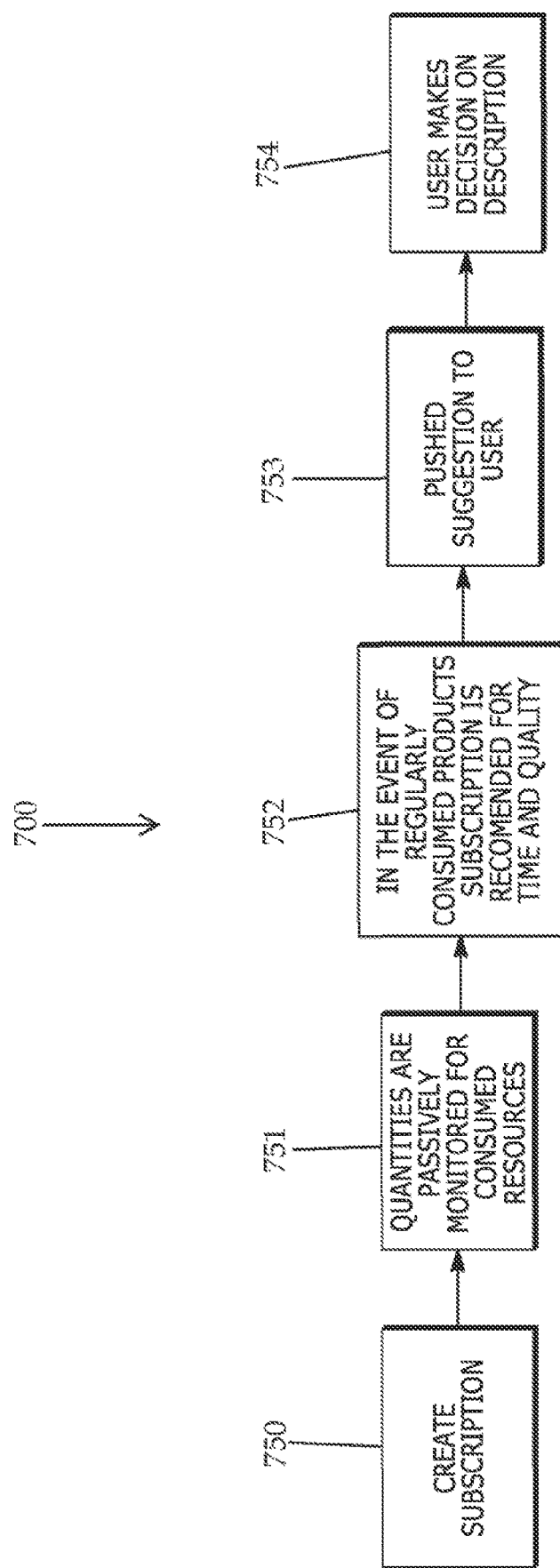

In addition to one time orders, subscription orders can be created 750 by the system 700 as shown in FIG. 7F. The system passively monitors 751 the rate at which products are consumed by the organization. For products that are consumed at regular rates, the system suggests 752 time and quantity for subscription based purchases. The system finds the best deals for these subscriptions as described in FIGS. 1A-2B above. The recommendation is sent 753 to the user, and the user makes 754 the final decision based on the information sent.

In some forms, the system utilizes the methods of FIGS. 1A-2B to push other types of purchases. For example, when a group buy, sales event, or other similar temporary price reduction is offered by a reseller, the system pushes recommendations for order to the user sooner than it normally would. In some forms, the pushed recommendation includes information representing the projected savings as well as the projected amount of time until the products are needed.

Figure 8A:
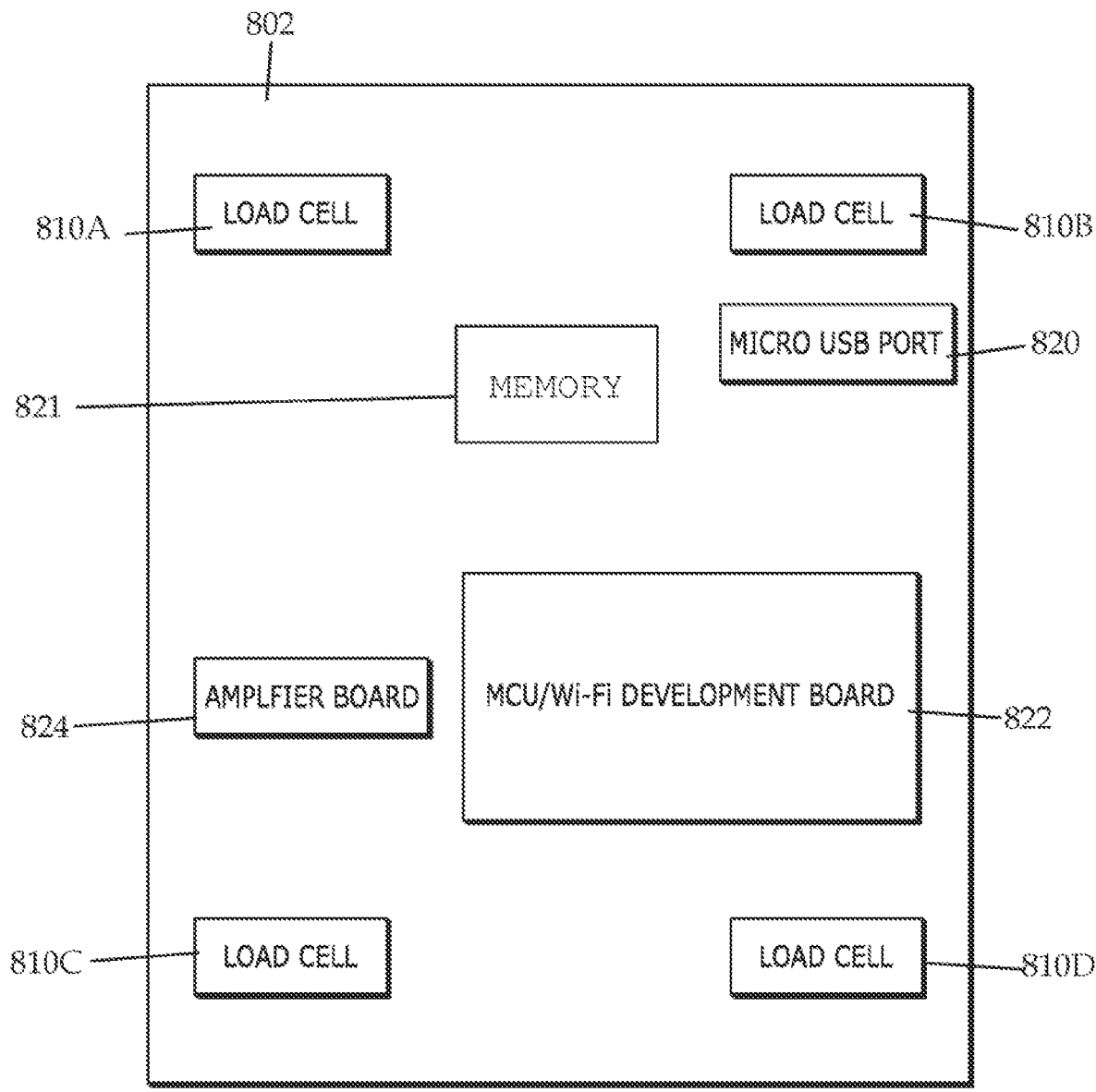
FIG. 8A is a block diagram of a shelf with weight sensors.
Figure 8B:
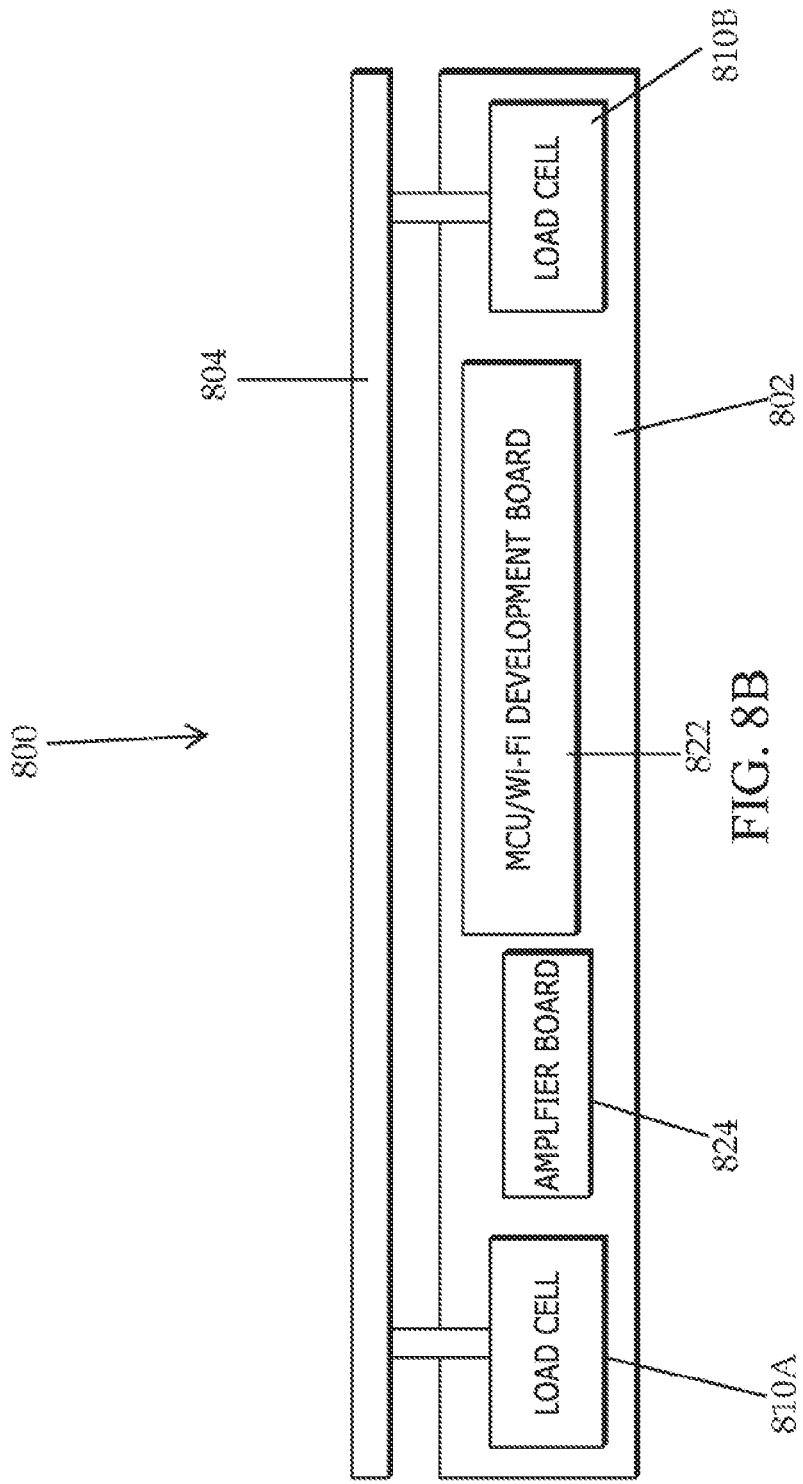
FIG. 8B is a side view block diagram of the shelf of FIG. 8A.

In addition to the scanners described above, some systems utilize additional sensors to automate the tracking of inventory. For example, sensors in the supply room detect the presence of and quantity of products. In one form, scales are used to detect products. For example, tension bar scales built into the shelves. An exemplary shelf 800 with load cells 810A-D for detecting the weight of a product is shown in FIGS. 8A-8B and described below. Alternatively or additionally, conductive plastic is used as a shelf surface, such as Velostate®, to detect the shape and weight of items. The shape and weight are compared to stored values to identify the product and quantity of products.

Below an exemplary use of the system and methods of FIGS. 7A-7F is described. This example is not limiting, it is just to illustrate the system in greater detail by use of an example. While an IT department is used in the example, other departments or organizations can use the system.

Data Types in the System of FIGS. 7A-7F

Team—The IT staff of an organization or all entities that would be actively managing inventory.

User—Individual member of the IT team, can have limited access to data set and limited capabilities Location—A physical address of a business, can have inventory assigned directly, has QR Code.

Room—Belongs to a location, can have inventory assigned to it, either deployed or stored, has QR Code.

Person—A non user entity that can be assigned inventory i.e. an employee at a company, can have QR Code.

Product—An item that is owned by a company, a type of products, such as a Macbook Pro, would be a product.

Part—The individual manifestations of a product. The three Macbook Pro's on hand would each be a part related to the parent product, has QR Code.

Deployment—The movement of a part to a person, place, or product, has parts assigned to it and destination for those parts, has QR Code.

Order—A user constructed order of products.

Offer—A reseller price response to an order.

Template—A recorded record of connected data types from a product data import.

Virtual Serialization

The created faux serial numbers attached to parts in inventory for the purpose of tracking deployment and activity related to them. An easier way to serialize and manage individual part records.

Inventory Deployment to Person

You have 10 laptops in your inventory that aren't currently deployed, a new employee joins the company and needs a laptop. At this point you've already created the person record in the system.

1) Click create simple deployment and assign a laptop to that deployment.
2) In this particular instance the laptop will travel with the person so rather than assigning it to a room, we just assign it directly to a person record, the new employee
3) The system directs you to retrieve a laptop and print the virtualized 'serial number' in the form of a QR code and attach it to the laptop.
4) The deployment status is set to 'pending.'
5) A) The laptop is delivered to the person who will be using it and they open the QR code scanner on their smart phone and scan the QR code. They confirm their identity and the deployment is closed. B) The user who is delivering the laptop opens the TekCloset Mobile app and scans the QR code and takes a picture of the employee with the laptop, the deployment is marked closed.

Inventory Deployment to Room

Same scenario as above except in this instance we will be deploying an Apple Cinema Display monitor to the employee's office. This particular piece of inventory shouldn't be going anywhere so we will be deploying it to a room, but also attaching it to a person record.

1) Click create simple deployment and assign the monitor
2) Search either the person or office that the monitor will be deployed in
   A) In the instance that the requisite room has not been created, simply select the person and click the "Deploy to Room box" and a room "New Employee's Office" will be automatically created
   B) If the room has already been assigned to a person the inventory will also be associated with them as well
3) The system will then direct you to either scan an existing QR code on the part or print and attach a new one.
4) The deployment status is set to pending.
5) Once the monitor has been delivered the user scans the QR code on the room and completes the deployment.

FIGS. 8A-B illustrate a shelf unit 800 having a plurality of load cells 810A-D. The shelf unit 800 includes a base 802 and a product support 804. The base 802 houses one or more load cells 810A-D. The product support 804 is supported by the load cells 810A-D such that the weight of the support 804 and supported objects is measured by the load cells 810A-D. In some forms, the load cells 810A-D only measure the total weight of the support 804 and supported products. In alternative forms, data from the array of load cells 810A-D enables the system to approximate the location from which a product was removed, such that the identity of the product can be predicted based on the location and weight.

The shelf unit further includes a MCU/Wi-Fi development board 822 and amplifier board 824 that together transmit a wireless signal conveying the data from the load cells 810A-D. Alternatively or additionally, the shelf unit 800 includes a memory unit 821. The memory unit 821 records and stores data output by the load cells 810A-D. The user can access the stored historical data through an input/output port 820, such as a USB, Mini USB, or Micro USB port.

In operation, the load cells 810A-D output data representing a change in weight of the product support 804 and supported products. The data is transmitted to a computer, such as an onsite computer or a remote server. The computer or server has a processor and a memory unit. The processor compares the measured data to a database, stored on the memory unit, of known values, such as weight and location, or products stored on the product support 804. Through this comparison, the system identifies the product and quantity of products removed. In some forms, instead of a remote computer and local controller with a memory unit and a processor performs the steps described above. As described in the processes above, the system tracks the rate at which products are removed from inventory in order to develop and recommend purchasing plans to replenish the inventory before it reaches zero.

While the shelf unit 800 is shown as a flat, horizontal shelf, it is understood that the shelf unit 800 could be replaced with any type of product support having a weight sensor. For example, weight sensors could be added to an existing counter, bin, cabinet, drawer, or other structure configured to support products. The weight sensors would be communicatively coupled to a processor to operate in the same way described above.

In some forms, the weight sensors are Internet of things weight sensors having built in wireless communications modules. The built in wireless communication modules operate to transmit data representing the measured weight to a remote processor.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for inventory management comprising:
   a product support with at least one weight sensor;
   a conductive plastic disposed on a support surface of the product support;
   a non-transitory storage medium storing information relating to inventory items; and
   a processor communicatively coupled to the at least one weight sensor and the conductive plastic, the processor programmed to:
   receive data from the at least one weight sensor indicating a change in weight;
   determine a location on the product support of the change in weight based on the data received from the at least one weight sensor;
   identify a removed inventory item based on a comparison of the amount of the change in weight and the determined location on the product support with the information relating to inventory items and based on a shape of the removed inventory item detected using the conductive plastic; and
   update an inventory database stored on the non-transitory storage medium to represent removal of the removed inventory item.

2. The system of claim 1 wherein the processor is further programmed to predict an amount of time before a quantity of inventory items is reduced to zero.

3. The system of claim 2 wherein the processor predicts the amount of time based on a plurality of stored times at which data received from at least one weight sensor indicated removal of an inventory item.

4. The system of claim 2 wherein the processor is further programed to:
   acquire prices for the removed inventory item from a plurality of sellers; and
   identify a best price from the acquired prices.

5. The system of claim 1 wherein the at least one weight sensor comprises a plurality of load cells.

6. The system of claim 1 further including at least one QR code scanner.

7. The system of claim 6 wherein the at least one QR code scanner is a smartphone communicatively coupled to the processor.

8. The system of claim 5 wherein the non-transitory storage medium comprises one or more servers.

9. The system of claim 1 further comprising a communication circuitry operably coupled to the at least one weight sensor, the communication circuitry configured to wirelessly communicate the data of the at least one weight sensor to the processor.

* * * * *